United States Patent [19]
Young

[11] 3,722,715
[45] Mar. 27, 1973

[54] VARIABLE LOAD AUGER APPARATUS

[76] Inventor: George M. Young, Oakland, Nebr. 68045

[22] Filed: Oct. 15, 1970

[21] Appl. No.: 80,862

[52] U.S. Cl. .................. 214/17 D, 198/69, 198/213, 222/229, 222/234, 222/310, 222/413
[51] Int. Cl. .............................................. B65g 65/46
[58] Field of Search ............... 214/17 D; 198/64, 213; 222/310, 412, 413, 229, 234

[56] References Cited

UNITED STATES PATENTS

| | | | |
|---|---|---|---|
| 3,107,825 | 10/1966 | Reed | 214/17 D X |
| 3,070,221 | 12/1962 | Bobrowski | 198/213 |
| 2,425,681 | 8/1947 | Lewis et al. | 198/213 |

Primary Examiner—Robert G. Sheridan
Attorney—Henderson & Strom

[57] ABSTRACT

A variable load auger apparatus to be used in combination with a high moisture grain bin, the apparatus providing for a regulation of the flow rate of grain and comprising; a cylindrical sleeve passing through the bin wall in an airtight fitting, a portion of the interior end of the sleeve having the top half removed therefrom; a cylindrical tube rotatably disposed within the sleeve having its exterior end secured to a delivery hopper and a portion of its interior end having the top half removed therefrom; an annular gasket abutting the upper end of the sleeve and held between the sleeve and the tube by a clamp, the basket providing an airtight fitting between the two; and a helical auger rotatably disposed axially within the tube having its lower end exposed by the cutaway portion of the tube and having its upper end extend through the delivery hopper to be mechanically secured to a constant-speed drive motor, wherein the tube is rotatable within the sleeve to vary the opening therebetween in contact with the grain, thus providing a variable delivery rate without breaking the seal of the bin.

7 Claims, 6 Drawing Figures

INVENTOR.
GEORGE M. YOUNG
BY
Henderson & Strom
ATTORNEYS

PATENTED MAR 27 1973 3,722,715
SHEET 2 OF 2
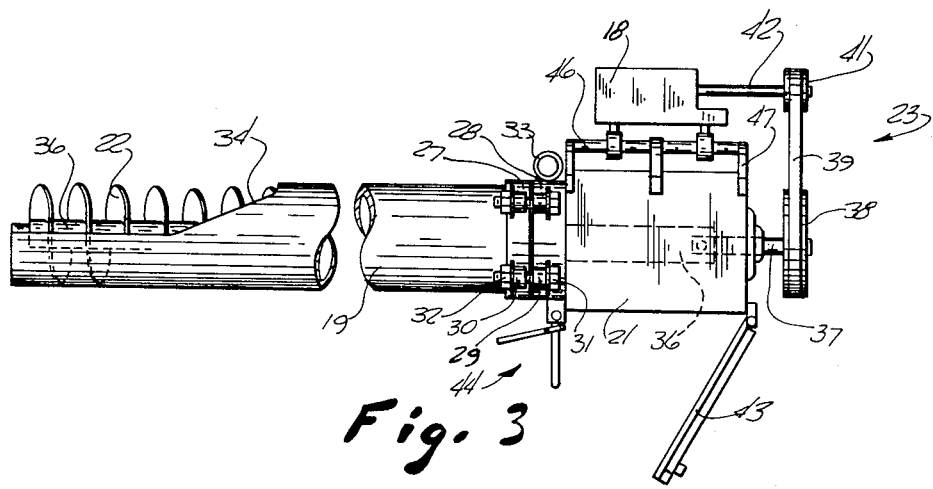
Fig. 3
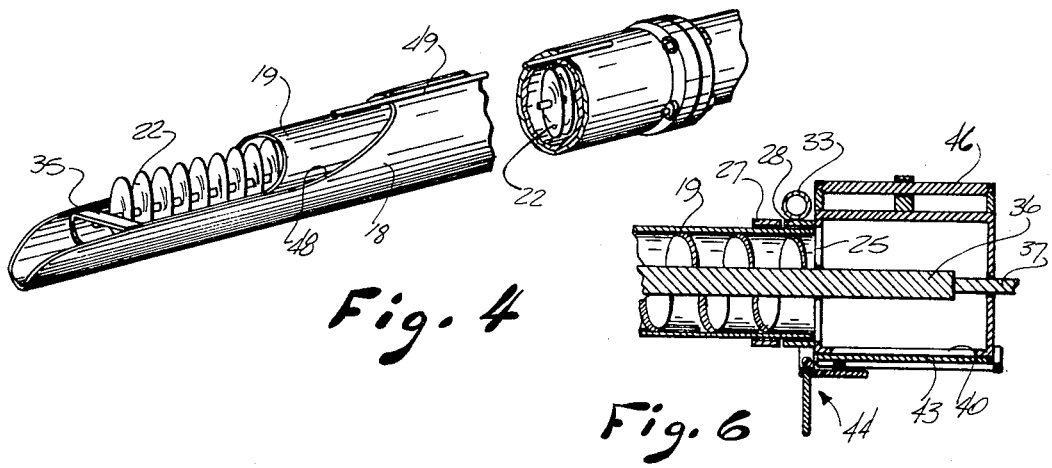
Fig. 4
Fig. 6
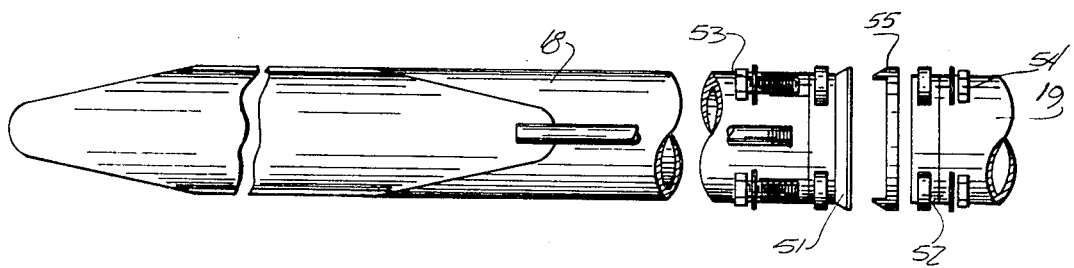
Fig. 5
INVENTOR.
GEORGE M. YOUNG
BY
Henderson & Stern
ATTORNEYS 3,722,715

VARIABLE LOAD AUGER APPARATUS

BACKGROUND OF THE INVENTION

This invention relates generally to a variable load auger apparatus usable for high moisture grain bins. High moisture grain is becoming a common feed for farm and ranch stock. Whereas a dry grain can be stored in any bin so long as it is kept dry, a high moisture grain must be stored in a substantially airtight container to prevent oxidation and to retain the high feed value of the grain. Thus, airtight grain bins have been used with a variety of methods being devised to remove the high moisture grain while retaining the airtight integrity of the bin.

A common method of removing high moisture grain is to employ an auger conveyor system whereby the auger extends into the bin through a tube which is secured through the bin wall in an airtight fitting. The auger is exposed to the grain on the interior of the bin and is powered by a constant-speed engine outside the bin. The system remains operable and in place as long as there is grain in the bin, and it is not necessary to enter the bin, thereby causing a break in the airtight integrity.

However, occasions have arisen which necessitate the entering of the bin. The auger may feed the grain within the bin at a rate which is too fast for a subsequent conveyor or a grinder outside the bin. Costly variable speed motors or alternate stopping and starting of the engine would be impractical solutions. Another solution, one that is more widely used, is to reduce the exposed area of the auger inside the bin, thereby slowing the flow rate. This has, in the past, necessitated the moving of a slidable cover by entering the bin, and could only be accomplished when the bin was substantially empty.

Another problem inherent in high moisture storage of grain lies in the compacting or chunking up of the grain. This compaction prevents the grain from flowing freely or flowing into contact with the auger, thus requiring the bins to be opened to allow a worker to enter to correct the problem.

SUMMARY OF THE INVENTION

The auger apparatus disclosed in this invention provides for the variance of the delivery rate of an auger conveyor driven by a constant-speed engine by simply rotating a tube from without the bin at any time, no matter what the grain level is in the bin, and still maintaining the airtight integrity of the bin.

This device also provides for the breaking up of chunks and grain build-up near the auger inside the bin by the insertion of a rod from outside the bin.

This invention is a variable load auger apparatus to be used in combination with a bin, whereby the delivery rate of an auger elevator which is powered by a constant-speed engine can be varied by the rotation of a tube within a sleeve, thereby effecting the variance of the auger-grain exposure area.

An object of this invention is to provide an auger apparatus for extracting grain from a high moisture grain bin, without breaking the airtight integrity of the bin.

Another object is to power an auger with a constant-speed engine, yet provide a method of varying the delivery rate of the auger.

A further object of this invention is the provision of a variable load auger apparatus wherein a tube containing the auger is rotatably mounted in a sleeve projecting through an airtight gasket mounted in the side wall of a bin.

Another object is to provide for an airtight connection between a rotatable tube and a sleeve.

Yet another object of this invention is to provide a means of dislodging chunks of grain and trash from a conveyor auger inside a high moisture grain bin without requiring the airtight integrity of the bin to be broken.

A still further object of this invention is to provide a means of regulating the grain flow rate from a constant-speed motor driven conveyor in the transferring of grain from a high moisture grain bin, by employing a cylindrical sleeve, a rotatable tube within the sleeve, and an auger rotatably disposed within the tube.

Another object of this invention is the provision of a variable load auger apparatus which is economical to manufacture, rugged in construction and extremely effective in use.

In the drawings, as hereinafter described, a preferred embodiment of the invention is disclosed, however various modifications and alternate constructions can be made thereto without departing from the true spirit and scope of the invention.

BRIEF DESCRIPTION OF THE DRAWINGS

FIG. 3 is a fragmentary side elevational view of the tube and auger.

FIG. 4 is a fragmentary perspective view of the sleeve with the tube and auger disposed therein.

FIG. 5 is a fragmentary top exploded view of the sleeve and associated parts.

FIG. 6 is a fragmentary sectional view of the receiving hopper disposed on the downstream end of the tube.

DESCRIPTION OF THE PREFERRED EMBODIMENT

Figure 1:
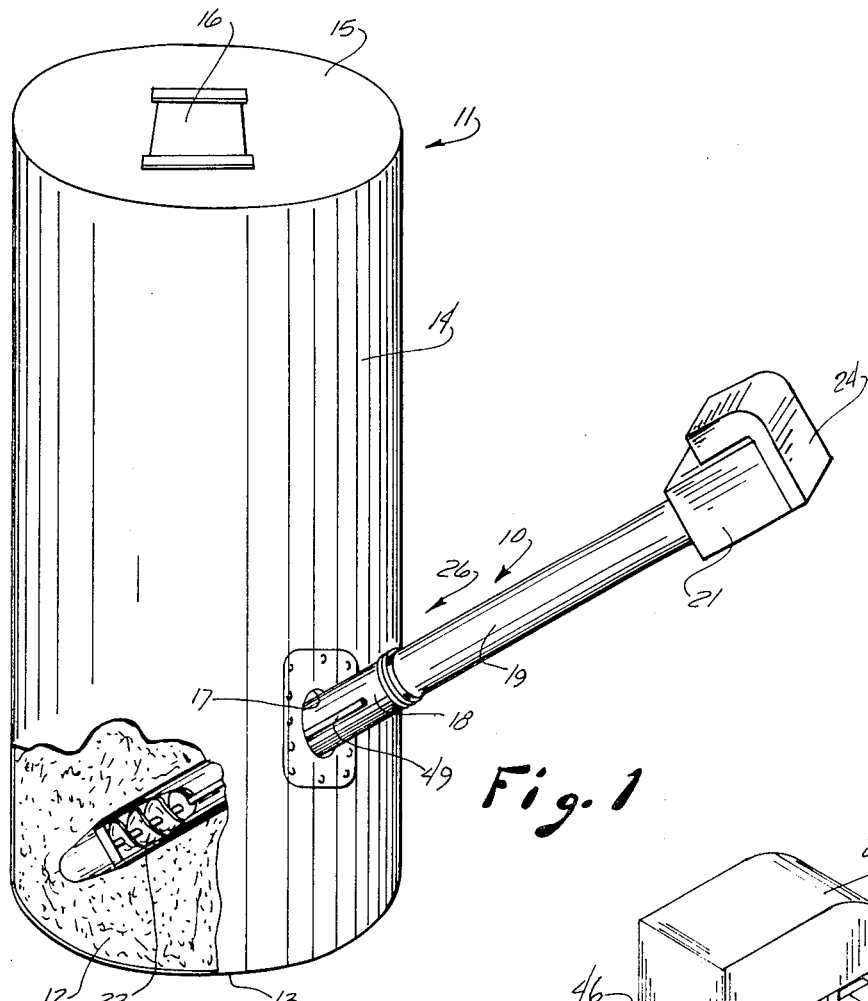
FIG. 1 is a perspective view of the variable load auger apparatus of this invention installed in conjunction with a high moisture grain bin with part of the side wall of the bin removed for purposes of clarity.

Referring now to the drawings, the preferred embodiment of a variable load auger apparatus of this invention is indicated generally at 10 in FIG. 1, as it is used in conjunction with a high moisture grain bin 11 containing grain 12 of high moisture content.

The bin 11 (FIG. 1) comprises a circular bottom wall 13; cylindrical sidewalls 14; and a circular roof 15 or the like, having a closable hatch 16 through which grain is passed when filling the bin. The bin forms a substantially airtight storage area for storing high moisture grain. An elliptical opening 17, spaced above the bottom wall, is cut through the sidewall for receiving the auger apparatus 10.

Disposed in airtight condition in the opening 17 (FIG. 1) and projecting both ways therefrom is the auger apparatus 10 comprising an elongated cylindrical sleeve 18; an elongated cylindrical tube 19 rotatably mounted in the sleeve and extending outwardly therefrom; a receiving hopper 21 secured to the downstream end of the tube; a rotatably mounted helical auger 22 axially disposed within the tube 19 and mechanically connected to a constant-speed motor 20 (FIG. 3) through a pulley and belt system 23 or the like, wherein the motor is slidably mounted on the hopper 21; a dust cover 24 is removably mounted over the motor and pulley systems 23; and clamping and sealing means 26 (FIG. 1) disposed between the tube 19 and the sleeve 18 outer end to prevent air from entering the bin through the annular passage formed between the tube and sleeve.

The tube 19 (FIGS. 3 and 6) has, proximate its upper end, an annular flange 27 permanently secured thereto. An opening 25 is formed in the hopper for receiving the downstream end of the tube 19. An annular stub 28 is secured to the hopper 21 around the opening and also receives the tube therein. Secured to the stub are a plurality of bosses 29 having holes (not shown) formed therethrough for receiving the shaft of a bolt 31. The flange 27 has a plurality of slotted bosses 30 secured thereto with the slots disposed in alignment with the holes in the bosses 29, thus permitting bolts 31 to be inserted therethrough to threadably receive nuts 32 for securing the tube to the hopper. Secured to the stub 28 is a short pipe 33 which projects transversely of the axis of the tube. The pipe 33 is adapted to receive one end of a lever (not shown) wherein upon loosening the clamping means 26 and exerting pressure on the other end of the lever, the tube can be turned about its axis. The upstream end of the tube 19, which extends into the interior of the bin has a portion thereof removed, or an opening 34 formed therein.

Extending radially across the lower end of the tube is a bracket 35 (FIG. 4). The upstream end of the helical auger 22 is disposed in a journal (not shown) secured to the bracket. The auger 22 has half-pitched flighting on that portion exposed to the opening 34 while the remainder of the auger has standard pitched flighting (not shown). The auger flighting extends from the bracket 35 to the hopper 21, while the auger shaft 36 extends through the hopper to an idler pulley shaft 37 (FIG. 3). Mounted on the pulley shaft 37 is an idler pulley 38 which is belt 39 connected to a driving pulley 41 mounted on a drive shaft 42 of the motor 20.

Figure 2:
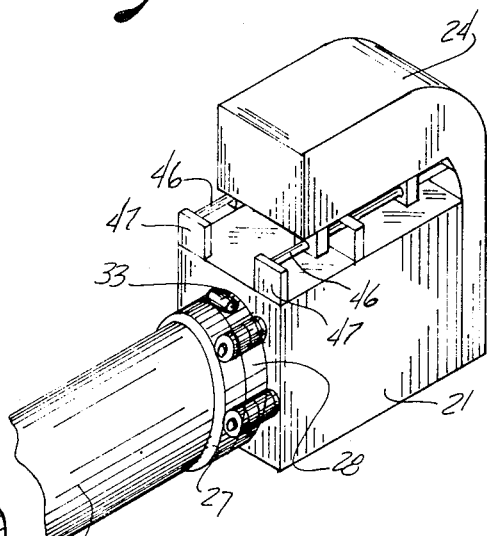
FIG. 2 is an enlarged partial perspective view of the invention absent the sleeve.

The hopper 21 (FIGS. 3 and 6) forms a rectangular shaped enclosure and has an opening 40 formed in the bottom wall thereof. Hingedly mounted over the opening is a door 43 which, upon being closed and locked by a locking means 44, provides a substantially airtight seal over the opening. A pair of spaced-apart rods 46 are mounted between support brackets 47 mounted on the top wall of the hopper. Slidably secured to the rods 46 is the motor 20. Thus it can be seen that the motor can be positioned along the rods to align the driving and idler pulleys (FIG. 3). The dust cover 24 (FIG. 2) is removably mounted over the motor 20 and pulleys 38 and 41.

The sleeve 18 (FIG. 4), cylindrical in shape and having a diameter slightly greater than the diameter of the tube 19, is concentrically disposed over the tube 19. The sleeve extends from the upstream end of the tube (FIG. 1) to a position outside of the bin and short of the downstream end of the tube. An opening or cutout 48 (FIG. 4) is formed in the sidewall of the lower end of the sleeve thus exposing a portion of the tube 19 and the auger 22. Protruding over the cutout 48 is the lower end of a pipe 49 which is longitudinally disposed along the sleeve and secured to the periphery of the sleeve. The upper end of the pipe 49 extends outwardly of the bin and terminates short of the downstream end of the sleeve. Secured to the upper end of the pipe 49 is a cap (not shown) for sealing same.

A flanged collar 51 (FIG. 5), secured over the sleeve 18 at the downstream end thereof, has a plurality of slots formed therein. An annular flanged ring 52, slidably mounted over the tube 19, has a plurality of holes formed therein in alignment with the slots of the collar. Mounted over the tube between the collar 51 and ring 52 is an annular tapered gasket of plastic or neoprene material 55. Upon inserting bolts 53 through the slots and holes and drawing the ring 52 to the collar 51 by the nuts 54, the gasket 55 effectively seals the tube and sleeve, thus providing an airtight fitting. The bin 11 at the opening 17 has a seal (not shown) around the sleeve and pipe 49 to prevent the seepage of air into the bin.

A rotation of the tube within the sleeve can be accomplished by loosening the nuts 54 at the ring and the nuts 31 at the stub, and by applying pressure to the rod inserted in the pipe 33. The sleeve remains stationary during the process however, as the tube is rotated, the exposure of the auger to the interior of the bin at the downstream opening in the tube thus can be increased or decreased. If the tube is rotated 180°, the cutout 48 and opening 34 are disposed opposite each other and the auger is substantially enclosed, thus preventing the flow of grain into the tube for conveyance by the auger. As the tube is rotated, the airtight integrity of the bin is maintained. In the event the grain in the bin bridges or clogs the opening and cutout, and no grain flows into the auger, the cap on the pipe is removed and the rod is inserted thereinto. The lower end of the rod will extend over the cutout and break any bridges of grain or unclog the opening. Removal of the rod and recapping of the pipe will again assure the airtight integrity of the bin.

I claim:

1. A variable load auger apparatus for conveying a granulated material at any predetermined rate of flow, the apparatus comprising:

a cylindrical sleeve open at both ends and having one end adapted to be inserted into a supply of granulated material and having the other end projecting outwardly from the supply granulated material, the sidewall proximate said one end having an opening formed therein for allowing the granulated material to flow therethrough;

a cylindrical tube rotatably mounted in said sleeve and having an input end disposed in alignment with said sleeve one end and an output end projecting outwardly from said sleeve other end, said tube inlet end having an opening formed therein adapted to be aligned with said sleeve opening;

turning means secured to said tube outer wall for rotating said tube in said sleeve thus effectuating a misalignment of said sleeve opening and said tube opening;

hopper means fluidly connected to said tube output end and having a shaft opening formed therein in axial alignment with said tube and having a discharge opening formed therein;

journal means mounted in said hopper means in axial alignment with said shaft opening;

auger means rotatably disposed in said tube and said hopper means with one end thereof journaled in said journal means and projecting outwardly through said shaft opening, said auger means operable to carry the material from said sleeve and said tube opening to said discharge opening;

power means operably connected to said auger means one end for rotating said auger;

an open ended pipe longitudinally secured to said sleeve outer wall, one end of said pipe terminating proximate said sleeve opening and the other end of said pipe terminating proximate said sleeve other end; and a rod adapted to be inserted into said pipe of sufficient length to extend beyond said pipe ends wherein said rod may be slidingly moved in said pipe with said rod one end dislodging any material damming the flow of material into said sleeve and said tube openings.

2. A variable load auger apparatus as defined in claim 1 including a door connected to said hopper means, said door movable from a first position adapted to seal said hopper means to a second position adapted to allow the material conveyed thereto to flow therethrough, seal means connected to said tube outer wall against said sleeve to prevent the flow of gas between said tube and said sleeve, and closure means adapted to be removably secured to said pipe other end for sealing said pipe.

3. A variable load auger apparatus as defined in claim 2 wherein said turning means includes a hollow open-ended member secured to said tube outer wall proximate said hopper means and projecting normally to the longitudinal axis of said tube, and an elongated member adapted to have one end thereof inserted into said open-ended member, the other end of said elongated member adapted to be grasped for applying a force radially to said tube for rotating said tube in said sleeve.

4. A variable load auger apparatus as defined in claim 3 wherein said auger means includes a shaft rotatably disposed in said tube and said hopper means and journaled proximate one end thereof in said journal means with said shaft one end operably connected to said power means, and helical flighting mounted on said shaft disposed in said tube and said hopper means.

5. A variable load auger apparatus as defined in claim 4 wherein said flighting exposed to said tube opening is half-pitched relative to the pitch of the flighting in the remainder of said tube.

6. A variable load auger apparatus as defined in claim 5 wherein said power means comprises a constant speed motor.

7. A variable load auger apparatus as defined in claim 6 wherein said hopper means comprises a hopper box having an inlet opening formed therein for receiving said tube outlet end, a shaft opening disposed opposite said inlet opening for receiving said shaft, and a discharge opening over which said door is movably mounted; said power means comprising a motor having a shaft projecting outwardly therefrom which is parallelly disposed to said auger shaft; interconnecting means mounted on said motor shaft and said auger shaft; and bracket means mounted on said hopper box for slidably receiving said motor, thus permitting said interconnecting means to be aligned in a common plane.

* * * * *